United States Patent [19]

Nelson, III

[11] Patent Number: 5,784,979
[45] Date of Patent: Jul. 28, 1998

[54] ADJUSTABLE LOAD AUTOMATIC RELEASING CLEAT

[76] Inventor: Robert H. Nelson, III, 1443 E. 54th St. Apt. 1, Chicago, Ill. 60615

[21] Appl. No.: 840,573

[22] Filed: Apr. 21, 1997

[51] Int. Cl.⁶ ................................................. B63B 21/04
[52] U.S. Cl. ...................... 114/218; 24/134 R; 254/391
[58] Field of Search ....................... 114/218, 213, 114/215, 217, 204, 205; 24/134 R; 254/391, 396

[56] References Cited

U.S. PATENT DOCUMENTS

| 251,153 | 12/1881 | Tubbs . | |
| 3,046,929 | 7/1962 | Piver | 114/218 |
| 3,113,545 | 12/1963 | Opel | 114/218 |
| 3,580,209 | 5/1971 | Olson | 114/218 |
| 4,217,847 | 8/1980 | McCloud | 114/218 |
| 4,348,974 | 9/1982 | Lerner | 114/218 |
| 4,453,486 | 6/1984 | Harken | 114/218 |
| 4,956,897 | 9/1990 | Speedie | 24/134 P |

Primary Examiner—Jesus D. Sotelo

[57] ABSTRACT

An adjustable load automatic releasing cleat for automatically releasing a rope or line at a predetermined tension load range. A rolling member (26) positioned adjacent to a cam member (30), releases the rope above the set tension range and recleats the rope below the load setting. The amount of load on the line activates the release and cleating mechanisms which are manually overridable.

20 Claims, 13 Drawing Sheets

Rolling member and adjuster introduced

Retrofit completed

Retrofit completed

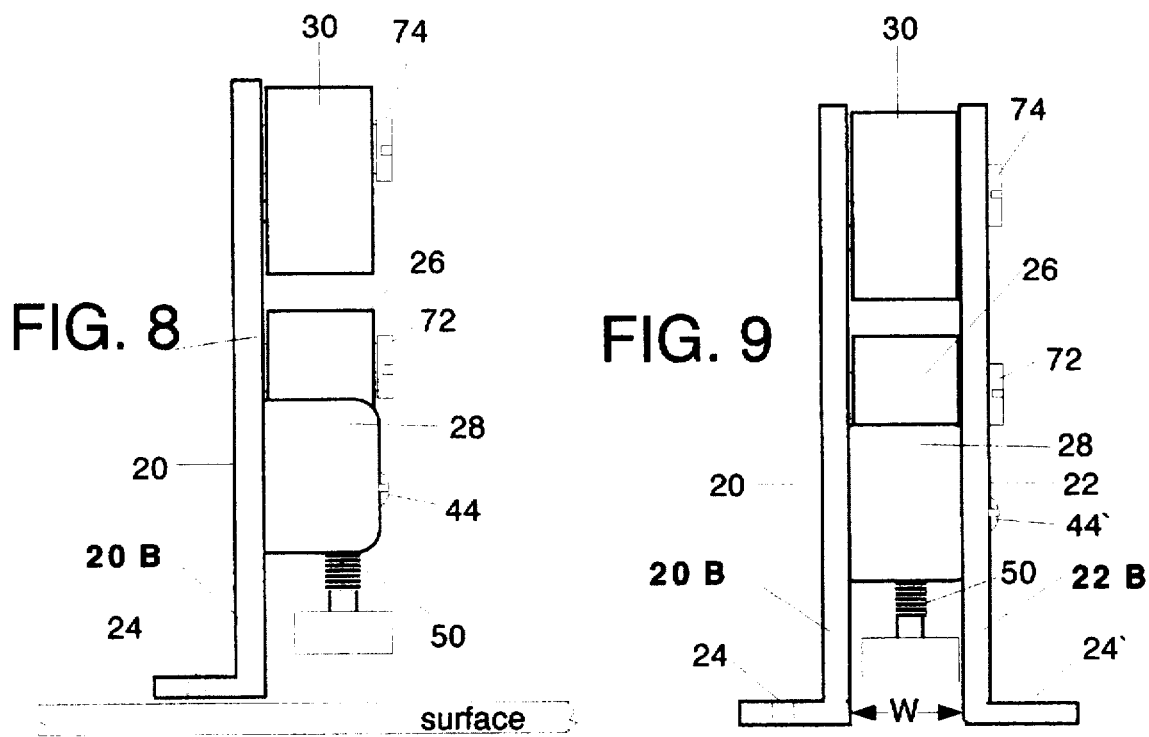
FIG. 8
FIG. 9
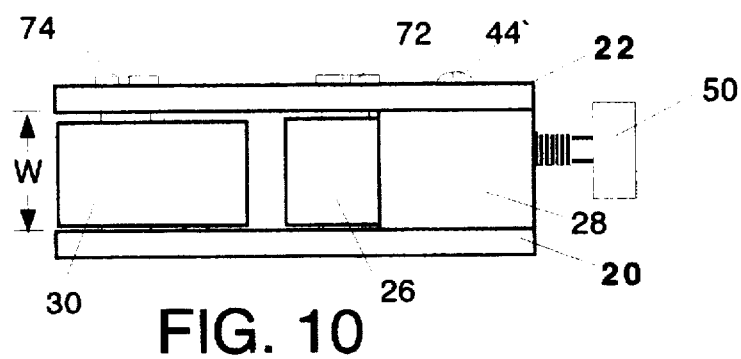
FIG. 10
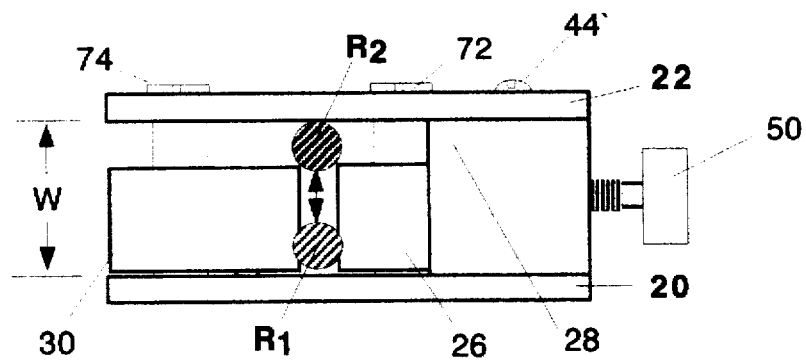
FIG. 11

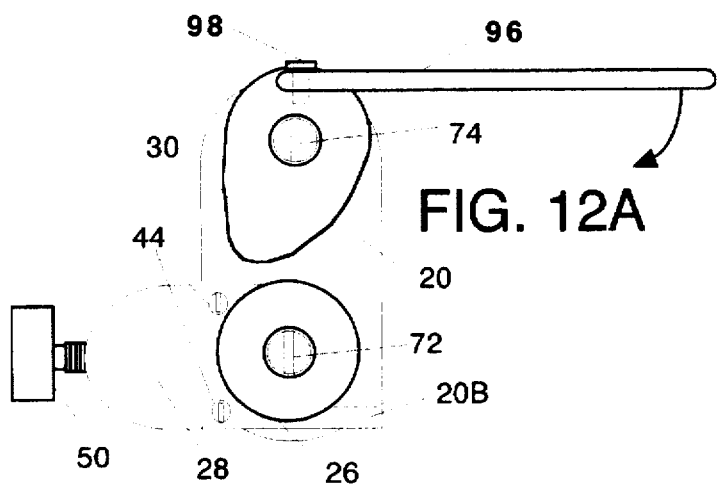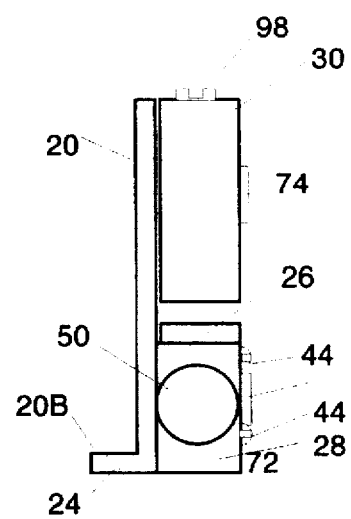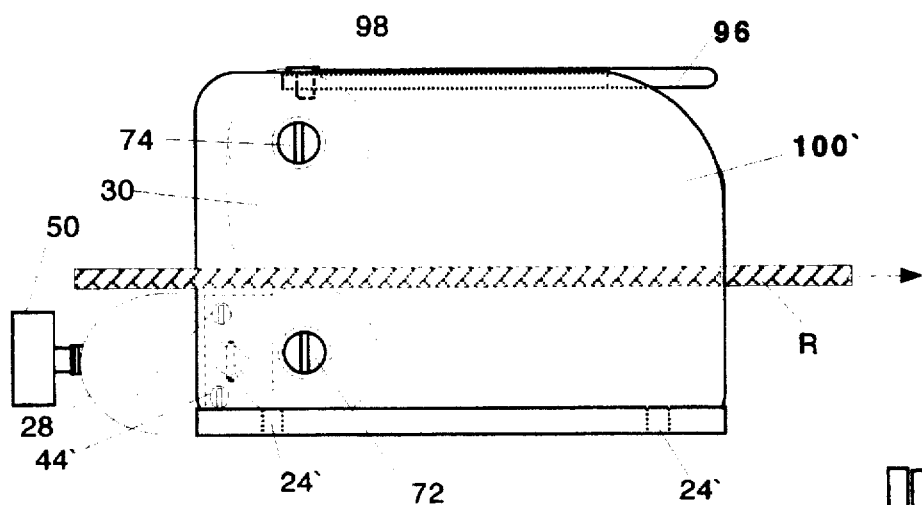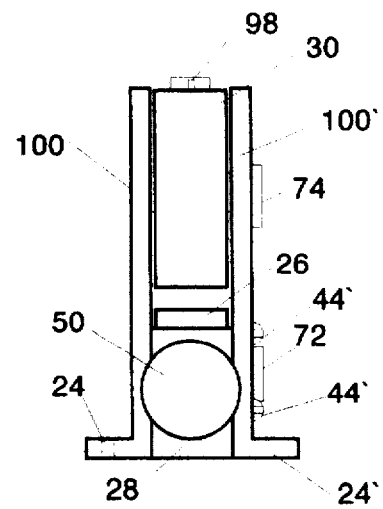
FIG. 12A
FIG. 12B
FIG. 12C
FIG. 12D

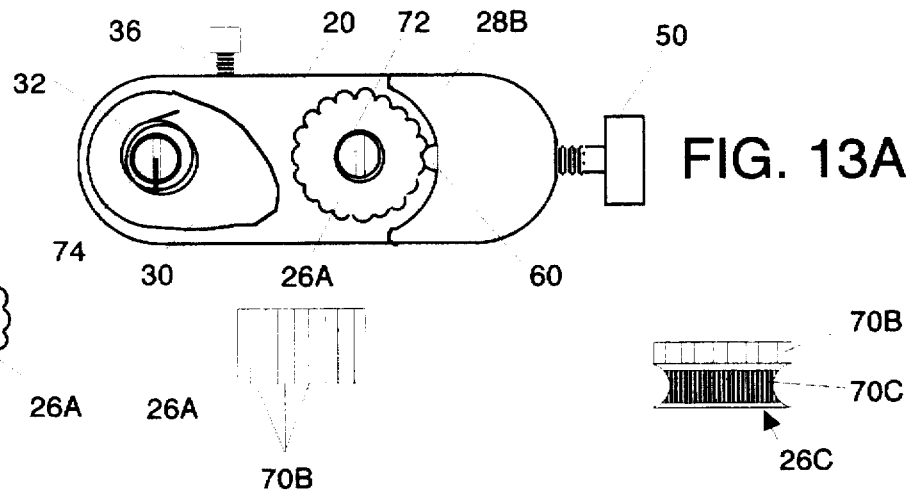

FIG. 13A

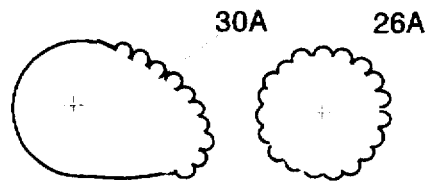

FIG. 13D

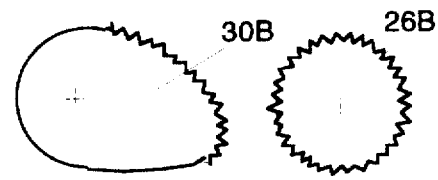

FIG. 13F

FIG. 13B
rolling member top

FIG. 13C
rolling member side view

FIG. 13E
rolling member grooved

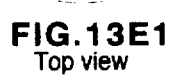

FIG.13E1
Top view

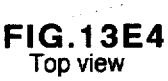

FIG.13E4
Top view

FIG.13E9
Side view grooved

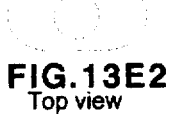

FIG.13E2
Top view

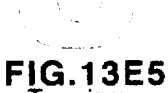

FIG.13E5
Top view

FIG.13E10
Side view striated

FIG.13E3
Top view

FIG.13E6
Top view

FIG.13E11
Side view grooved
& striated

FIG.13E7
Top view

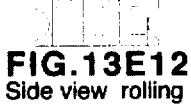

FIG.13E12
Side view rolling member grooved

FIG.13G Side view cam grooved

FIG.13E8
Top view

FIG.13E13
Side view grooved
& striated rolling member

FIG.13E14
Side view striated rolling member

FIG.13H Side view cam striated

FIG.13J Side view cam grooved & striated

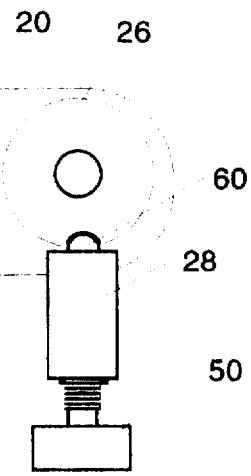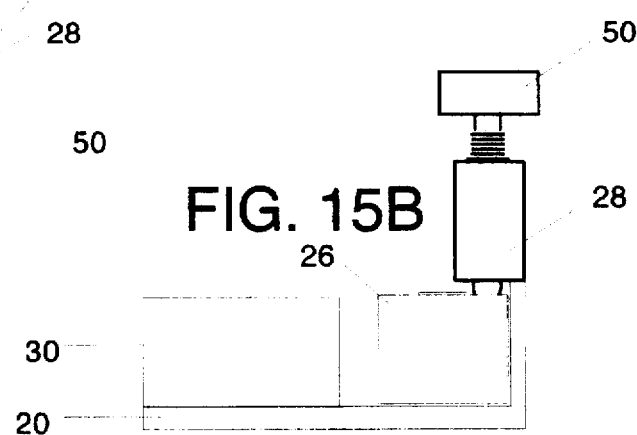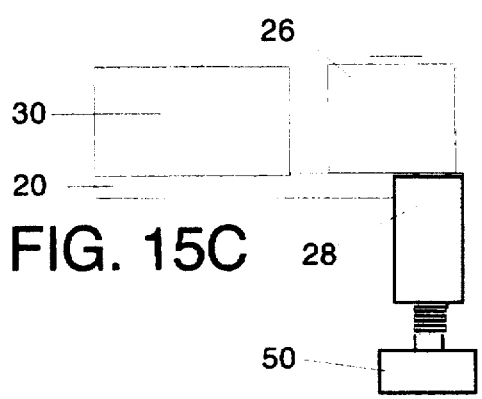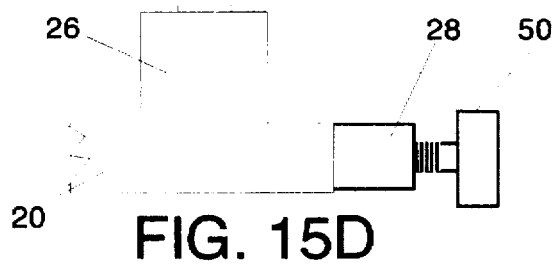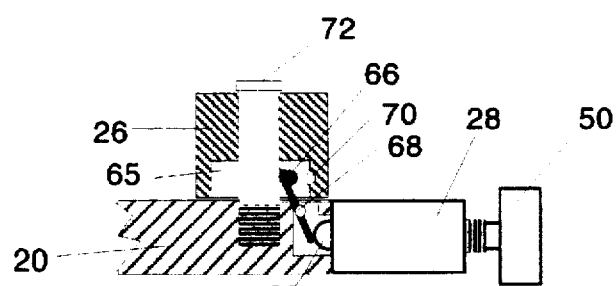

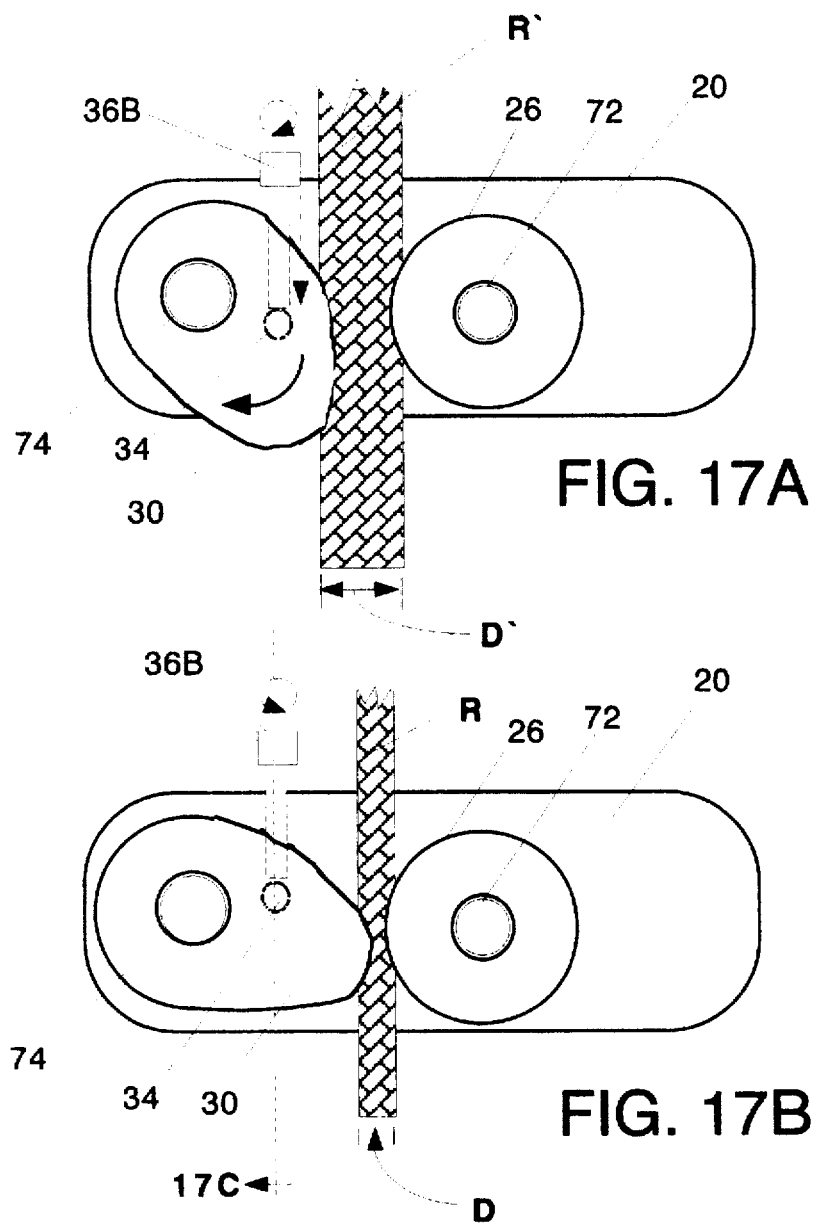
FIG. 17A
FIG. 17B
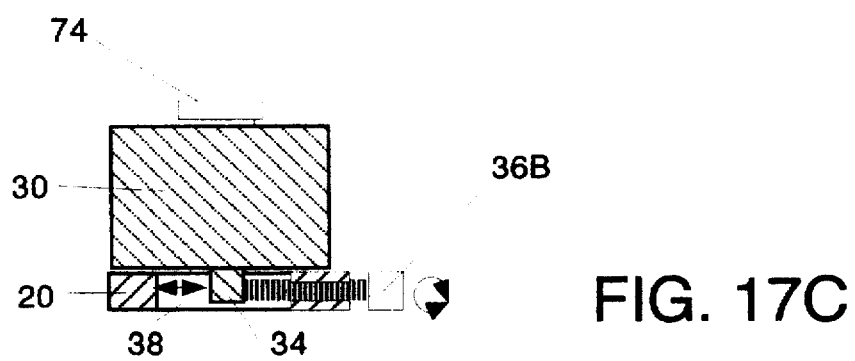
FIG. 17C

ADJUSTABLE LOAD AUTOMATIC RELEASING CLEAT

FIELD OF THE INVENTION

This invention relates to the general field of cleats used for securing ropes and lines, more particularly it relates to securing devices known as cam cleats.

BACKGROUND OF THE INVENTION

Cam cleats that are used to secure lines or ropes, especially on sailing craft, are well known in the art. These cleats are generally comprised of two opposing and pivoting cam-shaped pawls and include a gripping surface for releaseably gripping ropes. Advances in the art have improved the cam cleat holding features while reducing chafe on the rope and the effort needed to uncleat the cleated rope.

Load releasing cleats are not well known in the art.

DESCRIPTION OF THE PRIOR ART

Recent cam cleat advances are exemplified by Harken, U.S. Pat. No. 4,453,486 issued Jun. 12, 1984 and Speedie, U.S. Pat. No. 4,956,897 issued Sep. 18, 1990. Harken utilizes a pair of spring loaded non chafing cams supported by ball bearings to reduce friction. Speedie allows for the use of a bearing sleeve to support the cams. These teachings have mostly been in the direction of preventing line slippage and rope chafe while improving ease of use, but do not address automatic release of a line.

Alternatively Lerner, U.S. Pat. No. 4,348,974 issued Sep. 14, 1982 depicts a tension releasing cleat comprising two dome-shaped surfaces connected by ratchet mechanisms to secure a line with adjustable tension head cap mechanisms on each dome to limit line slippage by using friction washers under each dome. However the effects of the marine environment, water, salt, dirt, oil, temperature and wear will alter the friction or slipping characteristics of the dome on the friction washers and most likely will require frequent adjustment. Adjustment of each head cap mechanism requires a tool to be inserted in the tops of the domes. In practice it would be cumbersome to carry a tool and even more difficult to make the needed adjustments on a bobbing or moving sailboat. Lerner further uses "U" shaped collars, set screws, springs and elliptical holes to movably position the domes in order to accommodate lines of differing size. This arrangement requires multiple parts and still further adjustments.

Olson, U.S. Pat. No. 3,580,209 issued May 25, 1971 depicts a friction-controlled release safety cleat which utilizes a ratchet wheel mounted on a pivotal cam arm. The line is secured between the arm mounted ratchet wheel and a raised wall. Like Lerner, Olson utilizes a tightening means on top of the ratchet wheel which relies on overcoming friction on a washer to release a line. As with Lerner, friction release can become very temperamental and at the worst unreliable and require frequent adjustments and routine cleaning and or replacement of a worn friction washer. Furthermore, due to the close proximity of the adjuster on top of the ratchet wheel, great care is needed when making adjustments under working conditions in order not to get a finger caught by the turning ratchet if the line was unexpectedly released.

Tubbs, U.S. Pat. No. 251,153 issued Dec. 20, 1881 depicts a wire-stretcher using a wood lever and a cam jaw and a counterpart roller to grip and stretch a wire for use for fences. However this device does not provide for automatic release of the wire.

Present cam cleats are mostly released manually and do not provide for compact automatic line release. Tension releasing cleats in the prior art are for the most part bulky, complicated, require excessive adjustments or rely on temperamental and less predictable friction surfaces to release a line.

Whatever the precise merits, features and advantages of the above cited references, none of them fully addresses, achieves or fulfills the purposes of my adjustable load automatic releasing cleat, the present invention.

OBJECTS AND ADVANTAGES

I have discovered that a rolling member in opposition with a cam member, can reliably be controlled to restrain a line and then made to release the line at a predetermined load range by regulating the rolling member's movement. Furthermore, by incorporating this novel means to selectively retain a line, a new, simple, reliable, adjustable load automatic releasing mechanism and cleat are provided for.

No known prior art addresses this inventions novel rolling member and cam cleat design to automatically release a line or rope at adjustable load levels.

Advances in the art have all but eliminated line slippage and new composite ropes and lines have drastically limited line stretch. These refinements have improved line control and performance. However, this has drastically reduced the shock absorbing qualities that were inherent with line slippage at the cleat and stretch of the line. High loads can therefore build quickly without adequate warning to manually release a cleated line. In severe conditions loads on the line attached to the cleat can exceed maximum safe working levels. This can result in rope, cleat, or fastener failure and consequently loss of control over the device being cleated. Under sail this can cause equipment damage and personal injury, especially when loosing control of a boom or other apparatus. This can cause havoc for even the experienced sailor. Getting to and manually uncleating a line in time is not always possible, especially when sailing alone or with a novice crew. Reliable automatic tension release would also be extremely helpful in preventing violent capsize on high performance vehicles including but not limited to multihull, ice, and land sailing craft.

Consequently it is an object of my invention to provide an adjustable load automatic releasing mechanism and cleat that does not have the limitations of the referenced prior art. Furthermore the present inventions cleating and releasing means are more resistant to the environmental elements and do not require constant adjustments to retain a line at a preset tension range. In addition my invention eliminates the need for friction washers to release a line. This also eliminates premature line release due to worn, wet, or loose washers and eliminates the maintenance required to replace them. The invention can be adjusted to predictably release a line at a pre determined load or tension range. This prevents loads on the line from exceeding maximum or desired working levels while also limiting premature release of the line at less than desired range settings. The release of excess loads on the sheets or lines enhances and aids continuous control, and in the example of sailing, ease and pleasure of sailing.

Accordingly, besides the objects and advantages of the adjustable load automatic self releasing cleat described above in my patent, several objects and advantages of the present invention are:

(a) to provide for reliable automatic uncleating of a line under load;

(b) to provide for adjustment of the line release setting without having to place your fingers near the line gripping members. This greatly reduces the likelihood of entanglement;

(c) to provide for automatic recleating of the line when the line load falls below the preset release range. This allows the line to be automatically recleated when equilibrium is reached;

(d) to provide for increasing the load range at which the line is automatically released and;

(e) to provide for the flexibility to override the automatic line release means when it is desired;

(f) to provide for almost effortless release of a line under load by overriding the cleat retaining means;

(g) to provide for easy and quick manual insertion and removal of a line;

(h) to provide for the ability to be retrofitted to many existing cam cleat designs. This allows users and manufactures of conventional cam cleats to utilize the novel adjustable load self releasing features of the present invention.

Further objects and advantages are to provide for a versatile, compact and light weight automatic line release and cleating apparatus, that can be positioned and used in a multitude of applications where reliable automatic release of a line at a predetermined load range are desired.

Still further objects and advantages will be evident from the ensuing descriptions and drawings.

DRAWING FIGURES

In the drawings, closely related figures have the same number but different alphabetic suffixes. An adjustable load automatic releasing cleat will be referred to as ALARC.

FIGS. 5A–5E show various view of various aspects of an ALARC with a sliding release override.

FIGS. 8 and 9 show rear views of various aspects of an ALARC for a more vertical employment.

FIGS. 10 and 11 show rear views of various aspects of an ALARC with auxiliary mounting member.

FIGS. 12A–12D show various views of various aspects of an ALARC fitted with a cam lever and various mounting members.

FIG. 13A shows a top view of various aspects of an ALARC with lobed rolling member.

FIG. 13B shows a top view of the lobed rolling member.

FIG. 13C shows a side view of the lobed rolling member.

FIG. 13D shows a top view of the lobed cam and rolling member.

FIG. 13E shows a side view of the grooved and lobed rolling member.

FIGS. 13E1 thru 13E14 show various examples and views of generic variations of the rolling member.

FIG. 13F shows a top view of the striated cam and rolling member.

FIGS. 13G–13J show side views of various examples of generic modifications of the cam member.

Figure 14A:
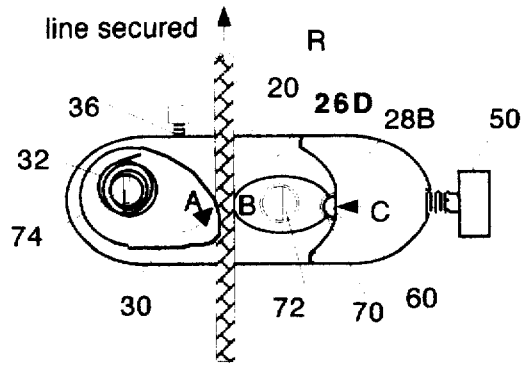
Figure 14B:
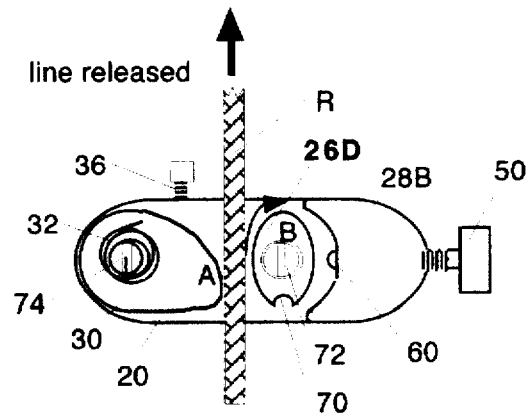

FIGS. 14A and 14B show top views of various aspects of an ALARC with mostly non-recleating rolling member.

FIGS. 15A–15E show various views of various aspects of an ALARC with examples of positioning the means for providing resistance to the rolling member.

FIGS. 16A–16D show top views of various aspects of an ALARC operation.

FIGS. 17A–17C show various views of various aspects of an ALARC operation with examples of cam member adjustment.

REFERENCE NUMERALS, NOTATIONS AND LETTERS IN DRAWINGS

| 20 | major mounting member | 22 | auxiliary mounting member |
|---|---|---|---|
| 20B | tab-major mounting member | 22B | tab-auxiliary mounting member |
| 24 | hole-mounting | 24' | hole-mounting |
| 26 | rolling member | 26A | rolling member |
| 26B | rolling member | 26C | rolling member |
| 26D | rolling member | 28 | support-means for resistance |
| 28A | support-means for resistance | 28B | support-integral |
| 28C | support | 28D | support |
| 28E | support-independent | 30 | cam member |
| 30A | cam member | 30B | cam member |
| 32 | spring-means for biasing | 34 | cam stop |
| 36 | adjuster-cam stop | 36B | adjuster-cam stop |
| 38 | channel-cam stop | 40 | passage-cam |
| 42 | passage-rolling member | 44 | screw |
| 44' | screw | 44" | screw |
| 46 | guideway | 48 | guide |
| 50 | adjuster-means for resistance | 51 | extender-adjuster screw |
| 52 | adjuster nut | 54 | adjuster screw |
| 56 | void | 58 | spring |
| 60 | keeper-means for resistance | 62 | channel |
| 64 | channel | 65 | channel |

-continued

| | | | |
|---|---|---|---|
| 66 | keeper member | 68 | pivot |
| 70 | seat-resistance surface | 70B | resistance surface |
| 70C | resistance surface | 72 | fastener-shaft rolling member |
| 72' | fastener-shaft long | 74 | fastener-shaft rolling member |
| 74' | fastener-shaft long | 76 | nut |
| 78 | nut | 76B | fastener |
| 78B | fastener | 80 | nut |
| 82 | nut | 84 | shaft/support rolling member |
| 86 | shaft/support cam member | 92 | retainer-cam member |
| 94 | retainer-rolling member | 96 | lever member-cam |
| 98 | screw | 100 | support member |
| 100' | support member | 102 | slide |
| 104 | lever | 106 | pivot |
| 108 | void | 110 | stop |
| 112 | channel slide | 114 | stop |
| 116 | channel stop | 118 | shaft |
| 120 | lever | | |
| A | reference position cam member | B | reference position rolling member |
| C | reference position adjuster | P | line passage |
| R | line or rope | $R_1$ | line position 1 |
| $R_2$ | line position 2 | W | width |
| R' | larger line | D | line width |
| D' | larger line width | | |

The drawings, reference numerals, notations and letters showing preferred embodiments of the invention are attached to assist in understanding the invention but the particularity of these descriptions are not to be understood as superseding nor in any other way limit the generality of these descriptions.

DESCRIPTION—FIGS. 1A–1D, 2A–2C, 3, 4, 5

Figure 1A:
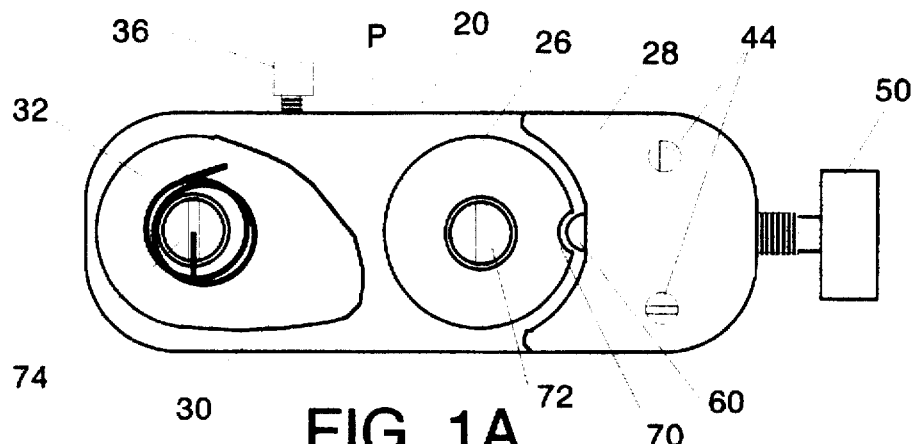
FIG. 1A shows a top view of various aspects of an adjustable load automatic self releasing cleat (ALARC).
Figure 1B:
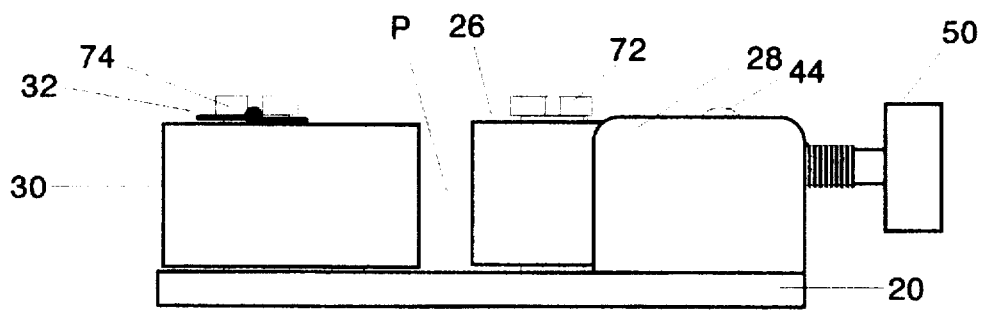
FIG. 1B shows a rear view of various aspects of an ALARC depicted in FIG. 1A.
Figure 1C:
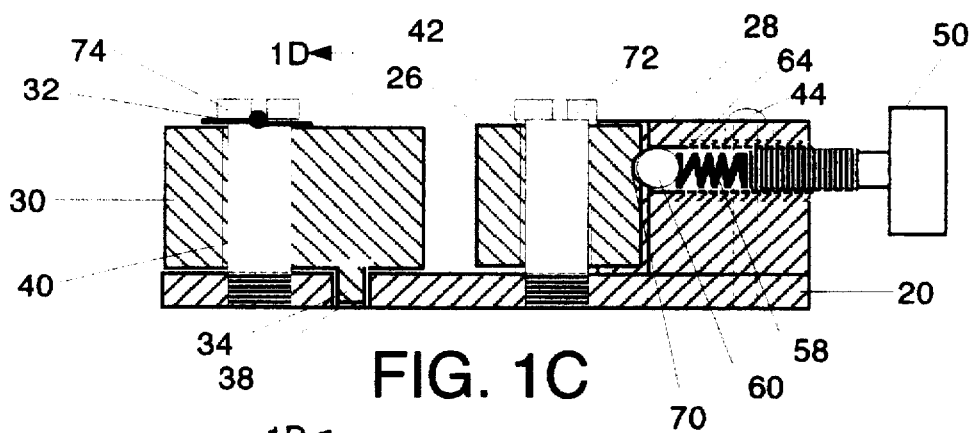
FIG. 1C shows a rear cross sectional view of various aspects of an ALARC depicted in FIG. 1B.
Figure 1D:
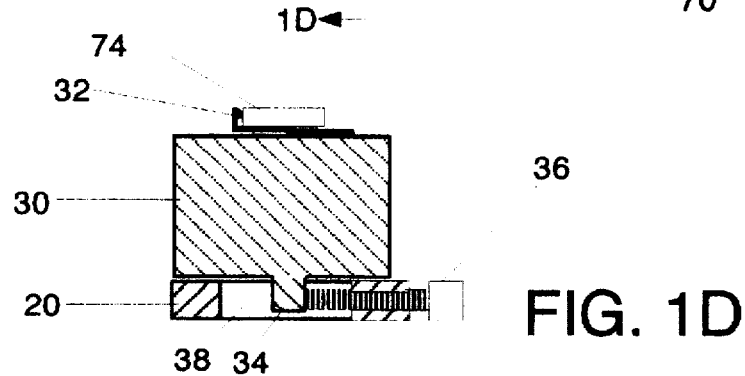
FIG. 1D shows a side cross sectional view of various aspects of a cam member and adjuster as depicted in FIGS. 1A–1C.
Figure 4:
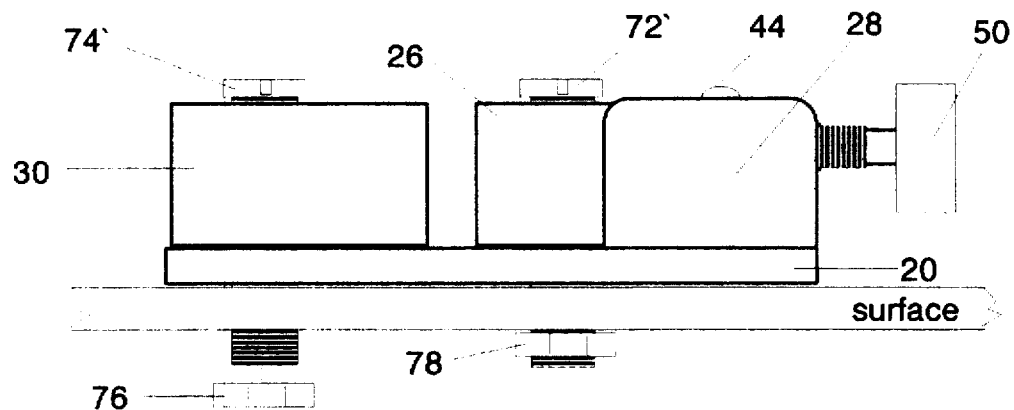
FIG. 4 shows a side view of various aspects of an ALARC with examples of mounting.

According to one embodiment of the present invention, there is provided an adjustable load automatic self releasing cleat as shown in FIGS. 1A–1D. Two gripping members, a cam member 30 and rolling member 26, are mounted in spaced apart relation. Cam member 30 and rolling member 26 provide a line gripping and releasing passage P there between through which a line or rope can extend. Cam member 30 is mounted to a base or major mounting member 20 for pivotal movement. Rolling member 26 is mounted to a base or major mounting member 20 for rotational movement. Movement of gripping cam member 30 toward rolling member 26 closes line gripping and releasing passage P until a line therein is gripped between gripping cam member 30 and the gripping rolling member 26. A resistance member or spring 32 is provided to cooperate with cam member 30 to bias cam member 30 against passage P. The surface allocated for gripping the line depends on the orientation of gripping cam member 30 to gripping rolling member 26. Cam member 30 rotation is mostly limited by its predetermined shape and the size and properties of the line or rope used. Referring now to FIGS. 1C and 1D the bottom face of cam member 30 is shown with a finger, boss, appendage or stop 34 extending mostly downward. Stop 34 cooperates with a void, recess or channel 38 in major mounting member 20 to additionally limit the degree of rotation of cam member 30 about strut, pylon, support, screw, or shaft 74. An adjuster 36 is adjustably secured to major mounting member 20 and adjustably limits the degree of rotation of cam member 30. Cam member 30 and rolling member 26 has passage 40 and 42 respectively extending mostly there through. Strut, pylon, support, screw, or shaft 74 and 72 extends into passages 40 and 42 respectively. Shaft 74 and 72 are secured with member 20. Alternatively shafts 74 and 72 may protrude beyond the base to serve as mounting fasteners (see FIG. 4 fasteners 74' and 72'). Referring now to FIGS. 1A–1C adjacent to the rolling member 26 is a housing or support 28 secured to major mounting member 20 using a suitable means of fasteners screw 44. Referring now to FIG. 1C support 28 accommodates a means for resisting rolling member 26 rotation. A resistance keeper 60 is movably restrained by a channel 64 supported by support 28. A means for applying resistance such as a resistance member or spring 58 cooperates with keeper 60 to allow for resistance to be applied to the rolling member 26. An adjuster 50 or means for adjusting resistance ultimately transmitted on the rolling member 26 is adjustably secured to cooperate with channel 64 by suitable means, such as screwing or threading. Additionally a rotation resistor, keeper indentation, striation or seat 70 on rolling member 26 may be mostly aligned to cooperate with keeper 60. It will be appreciated that multiple striations on rolling member surface 26 are provided for.

Figure 3:
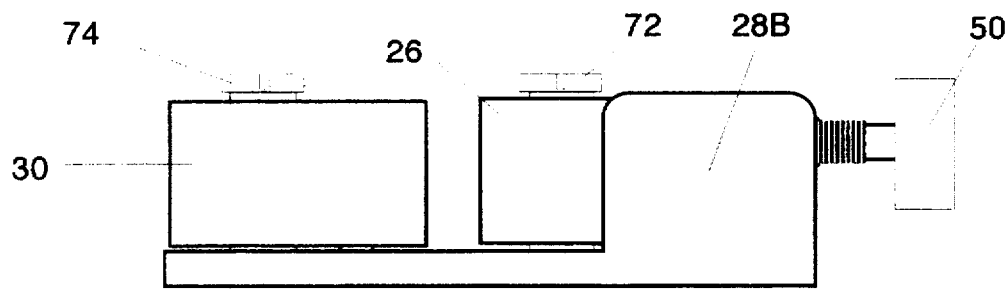
FIG. 3 shows a rear view of various aspects of an ALARC with more integral major mounting member and support.
Figure 5:
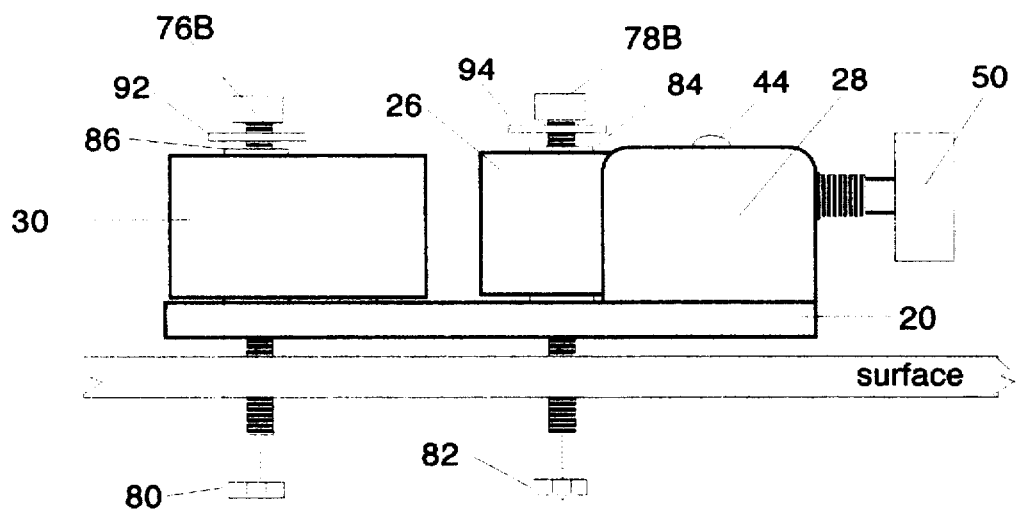
FIGS. 5 show a rear view of various aspects of an ALARC with example of mounting.

It will also be appreciated that cam biasing spring 32 is positionable to cooperate with any suitable portion of cam member 30. For example spring 32 can cooperate with the cam base in a conventional manner (not shown). It will be appreciated that the limit on cam member 30 rotation may be provided, positioned and adjusted by any suitable means and is not limited to stop 34. The means to limit rotation of cam member 30 may alternately be recessed or protruded sufficiently elsewhere on the cam member and serve the same function. Shafts 72 and 74 are shown mostly solid in construction but in another embodiment may be hollow. Referring to FIG. 5 shows an example of hollow shafts 84 and 86 using fastening 76B and 78B, and retainers 92 and 94, respectively to secure the cleat. It will be appreciated that in another embodiment the shafts may be integral with member 20 or be provided independently for use where no mounting member is provided and also may employ conventional bearings (not shown). It will further be appreciated that in another embodiment housing or support 28 may be integral with mounting member 20 to mostly eliminate use of fasteners 44 (see FIG. 3 support 28B).

Figure 2A:
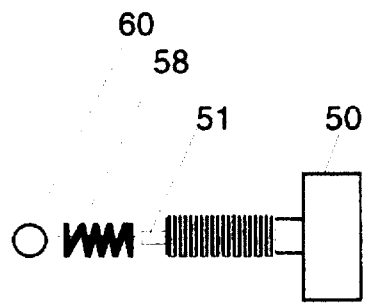
FIGS. 2A–2C show a top view of various aspects of the tension adjuster.
Figure 2B:
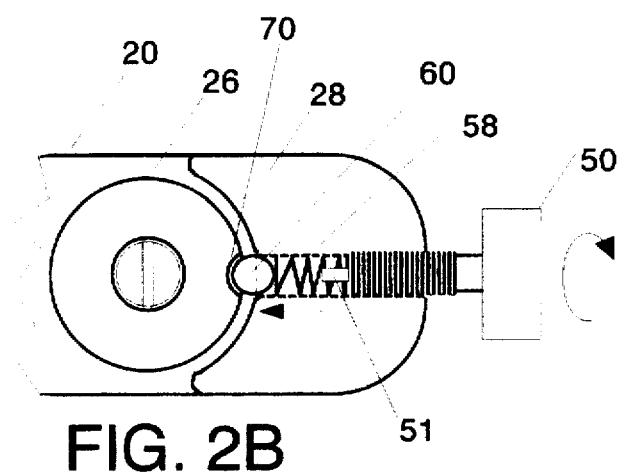
Figure 2C:
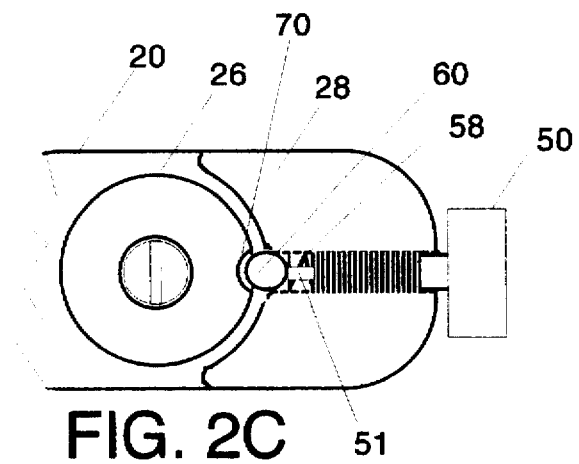

Referring now to FIGS. 2A–2C a means for preventing or overriding the automatic line release is shown. A pin, finger, appendage, or extender 51 is additionally positioned to cooperate with adjuster 50. Referring to FIG. 2C shows adjuster 50 and extender 51 adjustably positioned to mostly contact keeper 60. It will be appreciated that extender 51 need not necessary be affixed to adjuster 50 in order to cooperate with keeper 60.

DESCRIPTION—FIGS. 4A–4E

Figure 4A:
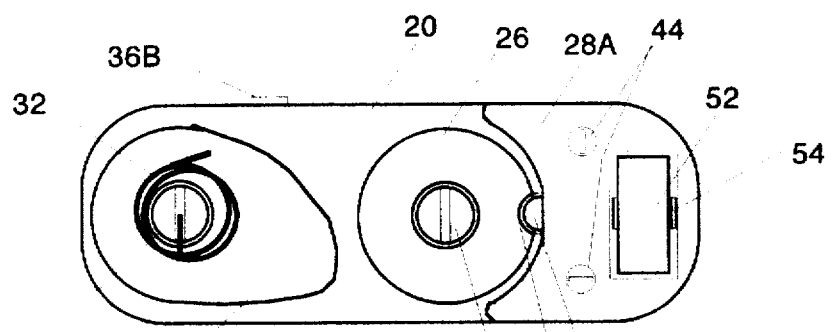
FIG. 4A shows a top view of various aspects of an ALARC in a more compact embodiment.
Figure 4B:
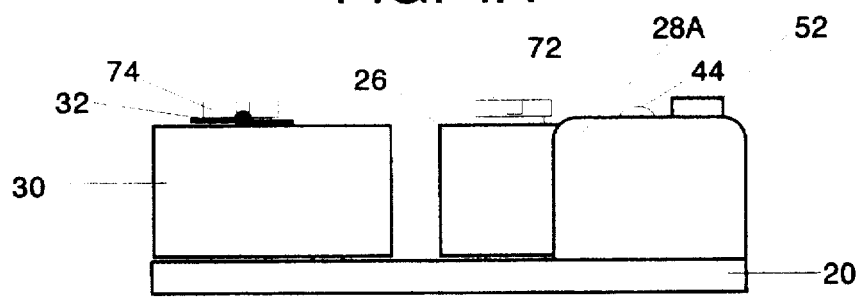
FIG. 4B shows a rear view of various aspects of an ALARC depicted in FIG. 4A.
Figure 4C:
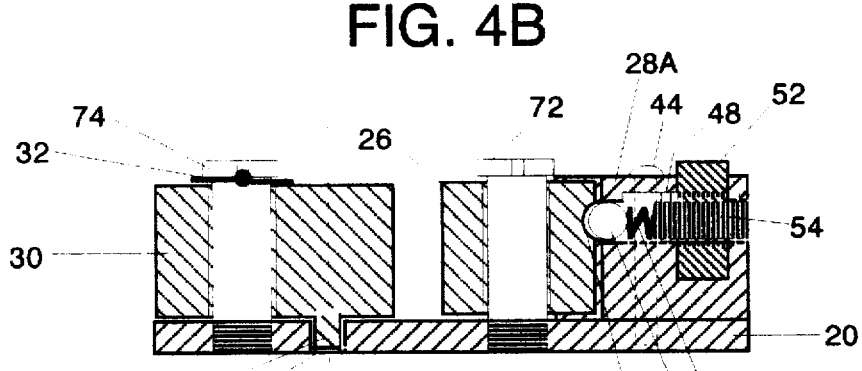
FIG. 4C shows a rear cross sectional view of various aspects of an ALARC depicted in FIG. 4B.
Figure 4D:
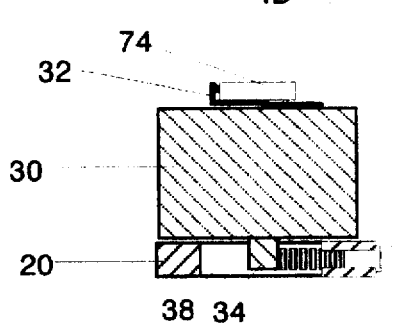
FIG. 4D shows a side cross sectional view of various aspects of a cam member and adjuster as depicted in FIGS. 4A–4C.
Figure 4E:
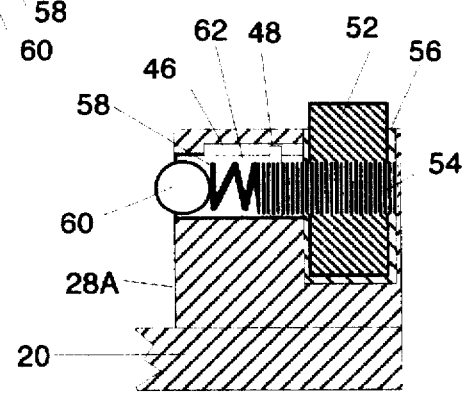
FIG. 4E shows an enlarged cross sectional view of various aspects of the adjuster as depicted in FIG. 4C.

Referring now to FIGS. 4A–4E it will be appreciated that another embodiment of the means for adjusting resistance to the rolling member 26 is shown. This configuration allows for the positioning of an adjuster cam, knob or nut 52 to afford a more compact and streamlined configuration. Adjuster nut 52 cooperates with adjuster screw 54 to mostly vary the amount of force placed on resistance member 58, resistance keeper 60, and rolling member 26. Adjuster nut 52 is sufficiently placed in close proximity to support 28A to sufficiently allow for adjustment of the means for resisting the rotation of rolling member 26. A void 56 retainably secures and allows rotation of adjuster nut 52. A finger, appendage, or guide 48 cooperates with adjustment screw 54 which is movably restrained by a channel 62. A channel, grove or guideway 46 is provided to cooperate with guide 48 to mostly resist rotation but allow mostly lateral travel of screw 54. Rotation of adjuster nut 52 jacks screw 54 mostly perpendicular to adjuster nut 52 plain of rotation. This allows screw 54 to move in either direction depending on the direction adjustment nut 52 is turned, which varies the force provided by the means for resisting rolling member 26 rotation. It will be appreciated that many variations of housing or support 28A are possible to mostly enclose the means for adjustment or adjuster 52. Enclosing the adjuster makes for a more compact presentation and prevents entanglement of a line on the adjuster. Referring now to FIGS. 4A and 4D means for limiting cam member 30 rotation is shown utilizing a screw for adjuster 36B that is mostly recessed on mounting member 20. Alternately the means for limiting the rotation of the cam member can be positioned in any suitable location to allow for limiting of cam member 30 rotation.

DESCRIPTION—FIGS. 5A–5E, 6A–6G

Figure 5:
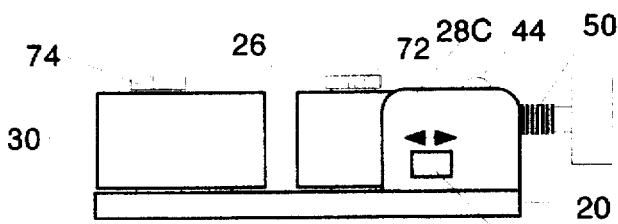
Figure 5B:
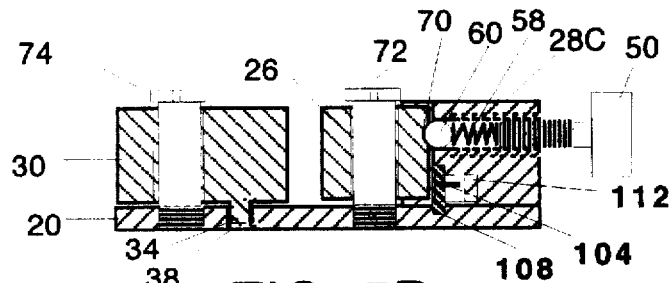
Figure 5C:
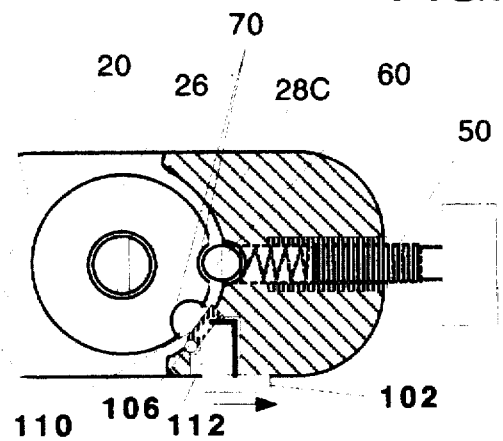
Figure 5D:
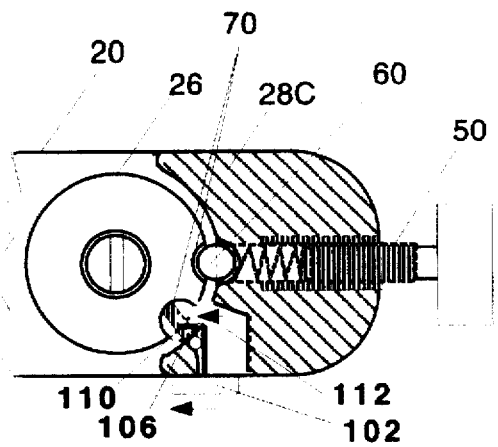
Figure 5E:
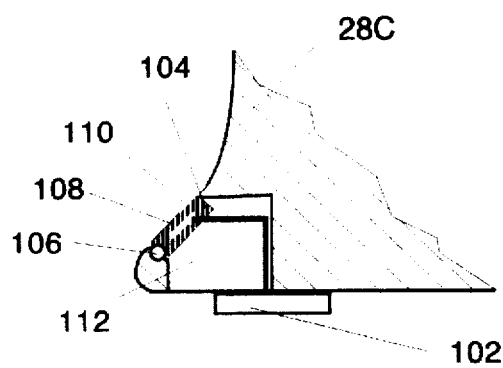

Referring now to FIGS. 5A–5E shows an example of an alternate means to override automatic release of the line. FIG. 5E shows a knob, protrusion or slide 102 in cooperation with an arm, link or lever 104 and a preventer, key or stop 110. Referring now to 5B–5D stop 110 is shown movably secured adjacent to support 28C by pivot 106. Lever 104 cooperates with stop 110 at void 108. A void, grove, or channel 112 cooperates with slide 102, lever 104, and stop 110, to selectably position stop 110 to resist movement of rolling member 26. FIG. 5C shows stop 110 in idle or non-engaged position. FIG. 5D shows stop 110 in the engaged or overriding position. It will be appreciated that striation or seat 70 or dedicated indentation on rolling member 26 will cooperate with stop 110.

Figure 6A:
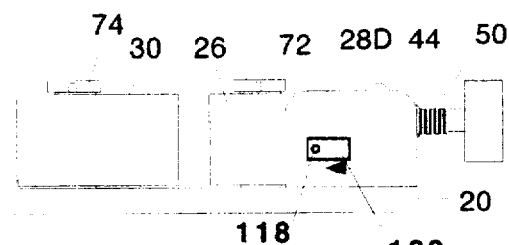
FIGS. 6A–6G show various view of various aspects of an ALARC and a lever release override.
Figure 6B:
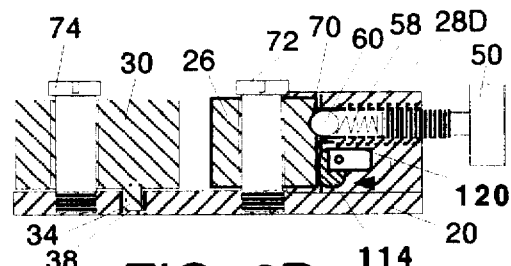
Figure 6C:
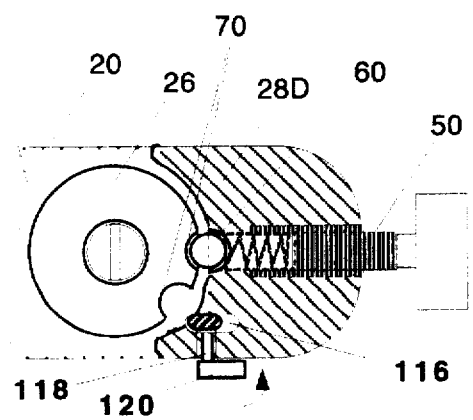
Figure 6D:
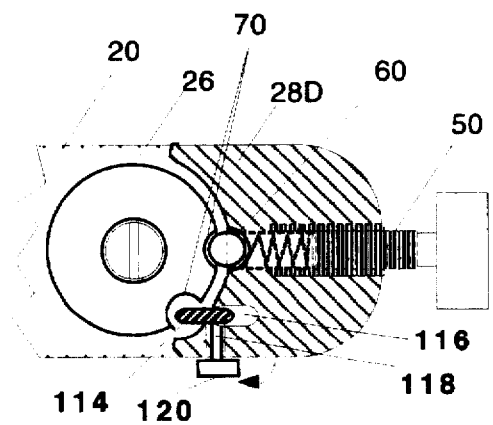
Figure 6E:
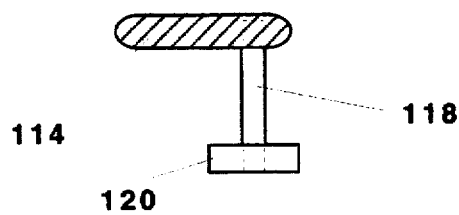
Figure 6F:
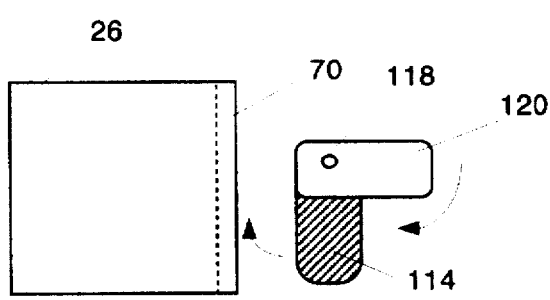
Figure 6G:
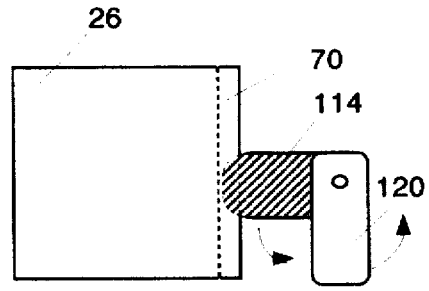

Referring now to FIGS. 6A–6G shows an additional means of overriding the automatic line release. A cam, knob, or lever 120 cooperates with an arm, link, or shaft 118 and an abutment or stop 114. Referring now to FIGS. 6C and 6D a channel 116 in the support 28D cooperates with stop 114 and shaft 118. Referring to FIGS. 6D and 6G lever 120 is movable to position stop 114 in sufficient cooperation with rolling member 26 to resist rotation. It will be appreciated that many means and different positioning of these means for overriding the automatic line release features of this invention are possible and may be positioned in any suitable position to cooperate with rolling member 26.

DESCRIPTION—FIGS. 7A–7D

Figure 7A:
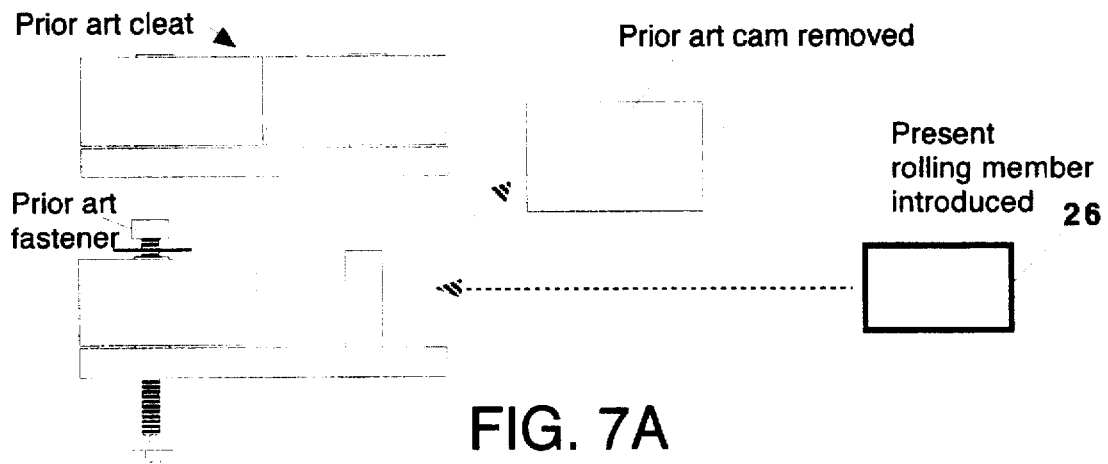
FIGS. 7A–7C show various view of various aspects of an ALARC being retrofitted to an existing cleat.
Figure 7B:
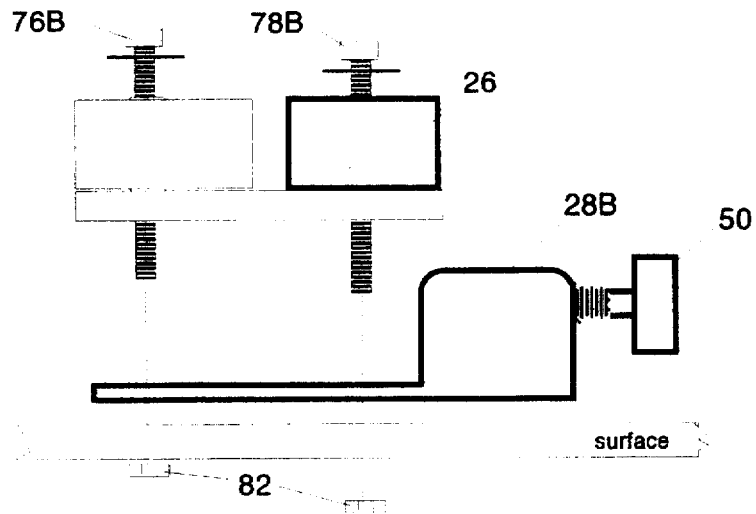
Figure 7C:
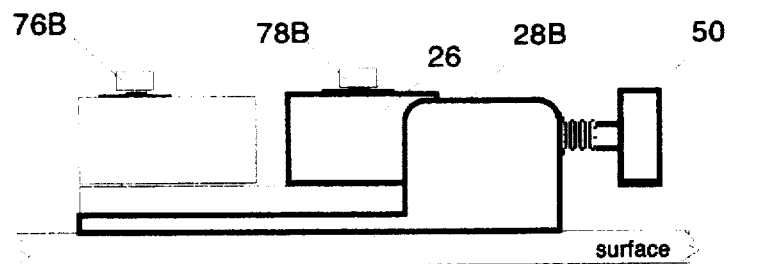
Figure 7D:
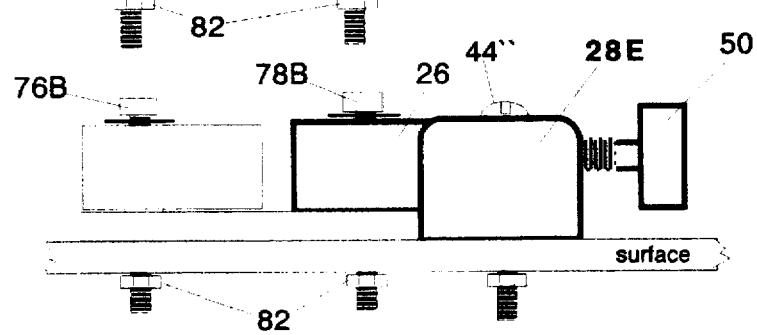
FIG. 7D show a rear view of various aspects of an ALARC being retrofitted to an existing cleat with adjuster mounted to a surface.

Unlike the prior art that require many special components and mostly dedicated embodiments for these components, the novel features of my ALARC are easily retrofitable to accommodate most present cam cleat designs. Referring to FIGS. 7A–7C retrofitting is mostly accomplished by removing an existing cam member and replacing it with the present inventions suitable rolling member. The existing cam axle, screw, supporting or bearing member(s) are mostly utilized to support the present inventions novel rolling member 26. Referring to FIG. 7B the modified cam cleat is further suitably secured, for example by fastener assemblies 76B and 78B, to the present invention means for resisting the rolling member and major mounting member when needed. Referring to FIG. 7D it will be appreciated that the means for resisting rolling member 26 is cooperateable in a housing or support 28E adjacent to rolling member 26. Support 28E is cooperateable mostly independent of the prior art cleat without the use of major mounting member 20 previously described. For example FIG. 7D shows support 28E being secured to a suitable surface adjacent to the rolling member 26 by a fastener means 44". By mostly incorporating my inventions novel features to an existing cam cleat referring now to FIGS. 7C and 7D, novel new and unexpected results are produced which are beyond the capabilities of the conventional cam cleat alone used in the retrofit.

DESCRIPTION—FIGS. 8–11

Now referring to FIG. 8 shows generic variations of my ALARC, more specifically modification to major mounting member 20, to allow for a more vertical positioning with the means for resisting rolling member 26 from mostly below. The present invention is mounted mostly vertically by extending or adding a mostly perpendicular tab 20B to major mounting member 20 with an example of means for facilitating mounting such as hole 24. The adjuster 50 for the means for resisting rolling member 26 is positioned to allow resistance adjustment in this more vertical mounting configuration.

Now referring to FIG. 9 show another embodiment of the ALARC, to allow for a more vertical positioning. Additional mounting tabs 20B and 22B are incorporated with major mounting member 20 and auxiliary mounting member 22 so that the ALARC is mountable more vertically and may be secured to the working surface by mounting holes 24 and 24' with screws. Additionally these mostly enclosing mounting members 20 and 22 may also serve to increase the working load of the adjustable load automatic releasing cleat.

Referring now to FIGS. 9 and 10 shows embodiments in which the distance W between major mounting 20 and 22 is mostly predetermined to retain the line's position between cam and rolling members 30, 26 respectively. It will be appreciated that fastener 44' may be eliminated by sufficiently securing support 28 by mounting members 20 and 22 utilizing shafts 72 and 74. In this configuration the line is manually released by reducing adjuster 50 resistance on rolling member 26. The line is restrained and is normally readjustable without rerouting the line thru the cleat. Referring to FIG. 11 the line $R_1$ can additionally be manually moved to the $R_2$ position and release. This means of release is possible when the predetermined distance W is increased to allow for removal of the line from between the cam and rolling members, as will further be described below in the operation of open embodiments of the invention. It will be appreciated that these generic modifications do not alter the intended functions of my invention, and are further securable to the desired working surface by any suitable means of fastening.

DESCRIPTION—FIGS. 12A–12D

Referring now to FIGS. 12A–12B the means for resisting rolling member 26 movement is positioned differently to allow for a lower profile for mounting. A lever member 96 is optionally attached to cam member 30 by a suitable means of fastening such as a screw 98. This lever configuration allows for release of the line by pressing down on the forward portion of the lever. The lever may alternately be positioned towards the rear or sides. Predetermined by the lever placement in relationship to the cam member, the lever is either pushed or pulled to rotate cam 30 away from the line which allows release of the line. This arrangement is useful when the line is to be released manually while the operator is located in front of the line without having to position them self behind the line to manual uncleat it. Referring now to FIGS. 12C and 12D shows lever member 96 cooperating with cam 30 in an embodiment that utilizes an extended mounting element 100 and 100' that mostly encloses the cleat. It will also be appreciated that the means of providing leverage or lever will cooperate with cam member 30 of most all embodiments of the adjustable load automatic releasing cleat when desired.

DESCRIPTION—FIGS. 13A–13J, 14A and 14B

As previously described rolling member 26 is preferably mostly rotatable around its axis. The rolling member has a sufficient resistance surface to mostly grip or restrain the line when the rolling member is restrained in the cleating mode. Referring now to FIGS. 13A–13F rolling members 26A–26C are shaped to mostly retain contact with the line when the rolling member is allowed to rotate. For example the rolling member may be mostly; round like, multisided, multilobed, finned or any suitable shaping. Referring now to FIGS. 13A–13F other examples of generic variations of the rolling member are shown lobed 26A, toothed 26B, grooved 26C. In addition, suitable combinations 26C, may include any suitable shaping, striation, resistance treating or coating of generic variations of the inventions rolling member 26. Additionally, other examples of generic variations of the cam member comprising: lobed 30A, toothed 30B, grooved (FIG. 13G), striated (FIG. 13H), and suitable combinations (FIG. 13J). Combinations may also include suitable shaping, striation, and resistance treating or coating to generic embodiments of cam member 30.

Rolling member 26A may also be grooved 26C on its resistance surface 70C to grip the line in an a squeezeable fashion. In addition the rolling member 26C may incorporate indentations 70B to cooperate with keeper 60. The shape of the rolling member is such to allow it to be somewhat restrained at least once during rotation by means for providing resistance or keeper 60 when sufficient resistance is applied by adjuster 50 or the means used to resist the rolling member rotation. This allows the rolling member to be mostly restrained by means for resistance or keeper 60 to facilitate recleating of the line.

Alternately, now referring to FIGS. 14A and 14B rolling member 26D may be shaped as to mostly loose restraining contact with the line, for example a more oblong 26D or multisided shaped rolling member. In this configuration when rolling member 26D, is released under line load by the means for resisting, rolling member 26D rotates and mostly losses contact with line R. This frees or uncleats the line. Furthermore the line will not normally be automatically recleated. In this configuration the rolling member will mostly require resetting in the releasable position in order to resecure the line. This configuration is useful when mostly one time automatic release of the line is desired without the recleating feature described previously. As can be seen from this example configuration, and FIGS. 13E1–13E14, the rolling members' shape is generically variable and retains a function as the rolling member in my present invention, the adjustable load automatic self releasing cleat.

DESCRIPTION—FIGS. 15A–15E

Now referring to FIGS. 15A–15E, the previously described means for applying resistance to the rolling member is positionable in any suitable location to provide resistance to rolling member movement. For description purposes the rolling member and the means for providing resistance of the adjustable load automatic releasing cleat, have been mostly depicted on one side of major mounting member 20, however, they are functional in a sufficient and mostly reversed order and mirror image configuration. Furthermore referring to FIGS. 15A–15C the means for providing resistance is additionally applyable mostly from the back, top and bottom respectively. Referring to FIGS. 15D and 15E shows the means for providing resistance being applied mostly to the inside of the rolling member. FIG. 15E show a more detailed example of resisting the rolling member from the inside with a channel 65 and seat 70 mostly inside the rolling member to accommodate a paw or keeper member 66. A pivot point 68 allows keeper member 66 to cooperate in this configuration with the means for providing resistance which is varied by adjuster 50. As shown many generic variations in positioning the means for applying resistance to rolling member 26 are possible in light of these teachings, without deviating from the desired results produced by the present invention. Furthermore many various means for applying a force for resisting the movement of the rolling member are also possible or available to serve the same function. For example, the means for apply resistance may be comprised from, but is not limited to; compression and resistance members such as, a spring, torsion member, resistance elements, and mechanical linkages, gears, and means utilizing hydraulic, pneumatic, magnetic, electromagnetic, electronic components, or any combination of these. Any suitable means cooperating to resist the movement of the rolling member may be utilized to provide the same suitable results.

OPERATION

Referring again to FIGS. 1A and 1B for descriptive purposes these figures will serve as a general representative example of the rolling member operation in all the previously described embodiments of the adjustable load automatic releasing cleat. Rolling member 26, is mostly rotatable around its center axis and is releasably retained at varying loads by adjustment of the means for providing resistance to rolling member 26. Referring to FIG. 1C resisting keeper 60 is shown as an example of suitable means to restrict movement of rolling member 26. Resistance is placed on rolling member 26 by resisting keeper 60, for example a bearing or suitable paw. Force is placed on keeper 60, by suitable means for applying resistance, resistance member 58, such as a spring or torsional member. Keeper 60 is positioned to mostly contact rolling member 26 while under resistance from resisting member 58. Force on resistance member 58 is varied by adjuster means 50. Force provided by adjuster means 50, ultimately influences the restriction of rotation of rolling member 26, and secures the rope or line between the adjacent cam member 30. Resistance on the rolling member is adjusted by the adjuster 50 to vary the desired load at which the rolling member is restrained. Keeper indentation, striation or seat 70, on the rolling member surface enhances the resistance to rotation. It will be appreciated that multiple striations and the depth of increased indentation on rolling member surface 26 will provide additional area to limit rotation. In addition these striations or indentations can be situated to aid in the gripping of the line.

(Cleating)

Referring now to FIGS. 16A–16D, FIG. 16A shows line R being inserted in the direction of the arrow indicated on the line, that direction being mostly opposite the direction of the intended loading tension on line R. Line R, is passed between cam 30 and rolling member 26. Cam member 30 is rotated away from the inserted line in the direction of the cam notated by arrow A. This allows for easy insertion of line R. Now referring to FIG. 16B line R is shown being automatically held between cam member 30 and rolling member 26, near reference positions A and B respectively, using a suitable biasing means to bias the cam member against the line, for example a spring 32 or resistance member. When tension is applied on line R opposite to the direction of insertion and in the direction of the arrow notated on line R, the line is mostly squeezed more between cam and rolling members 30 and 26, respectively, which secures or cleats the line further.

(Accommodating Lines)

Different types and sizes of lines with differing coefficient of friction are accommodated by varying the cam member rotation and surface that grip the line. For example, this is done by varying the amount of spring 32 force placed on cam member 30 which contacts the line. To further accommodate different types of lines, the means for limiting cam member 30 rotation, stop adjuster 36 such as a screw is used. Referring now to FIGS. 17A–17C the means for limiting cam member 30 rotation is shown. Referring to FIG. 17C, shows the means for adjusting the cam member position by limiting the rotation of the cam member by restricting cam member 30 stop 34 with adjuster 36B. Referring now to FIG. 17A shows cam member 30 being positioned by adjuster 36B to accommodate a mostly larger line R' with width of D'. Referring to FIG. 17B shows cam member 30 being positioned by adjuster 36B to accommodate a mostly smaller line R with width of D. This allows for adjustment of the cam member resistance forces on the different lines to be sufficient to resist slippage and yet allow the line to be released at the desired load range. Stop 34 and adjuster 36B aid in preventing excessive compression of the line between cam member 30 and rolling member 26. It will be appreciated that adjuster 36B is not always required and may be eliminated when the adjustable load automatic cleat is configured to a mostly specific application using a predetermined type and size range of line. For example this can be accomplished by predetermining the dimensions and features of the rolling member to cooperate with the characteristics of the line used.

(Manual Line Releasing & Cleating)

The following examples further describe some of the adjustable load automatic self releasing cleat operations and, for description purposes, refers to mostly horizontally positioned or mounted open embodiments of the adjustable load automatic releasing cleat. However, it will be appreciated that the present invention, the adjustable load automatic self releasing cleat can be enclosed, used, mounted, suspended, or hung in most any suitable orientation. Manual release of a line is accomplished by applying effort on the mostly free end of the line, mostly perpendicularly away from the horizontal plain of the cleats major mounting element. Cleating is achieved by applying effort on the line mostly perpendicularly towards the plain of the cleats' major mounting member 20. Up mostly refers to away from the major mounting member. Down mostly refers towards the cleats' major mounting member. For example, the line is manually uncleated under light loads by simply lifting up on the mostly free end of the line. Under medium loads the line is slightly pulled backwards and upwards at the same time to uncleat the line. Under extreme loads the line will most likely require more upward and backward effort to manually uncleat. Alternatively, the line can be almost effortlessly and easily released without pulling or tugging on the line by simply reducing the resistance on the ALARC novel rolling member tensioner until the line easily runs free. Referring to FIGS. 12A and 12C shows an alternate means for releasing the resistance on the line contributed by cam member 30 by pushing down on lever 96 which will also allow the line to run free.

(Automatic Line Release)

Referring now to FIGS. 14A and 14B, automatic release or uncleating is accomplished mostly when resistance forces on the cleated line R mostly exceed the resistance forces of the cleat members and means for resisting, (reference C), rolling member 26D. When this mostly occurs, referring now to FIGS. 16C and 14B rolling members 26 and 26D, and reference positions A and B, respectively, are allowed to rotate and the cleated line is allowed to run free.

(Automatic Line Securing)

Figure 16A:
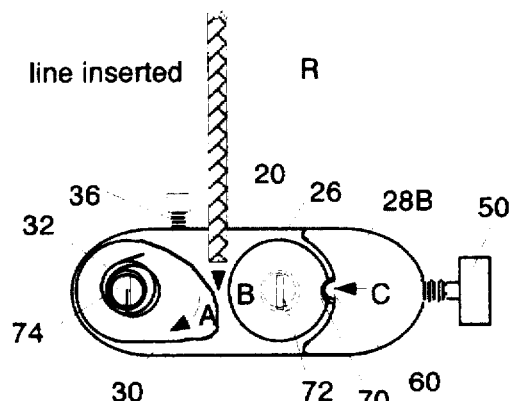
Figure 16B:
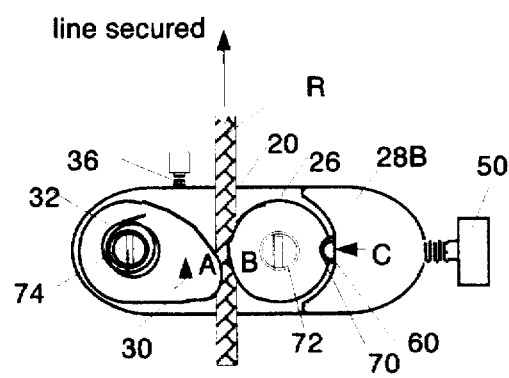
Figure 16C:
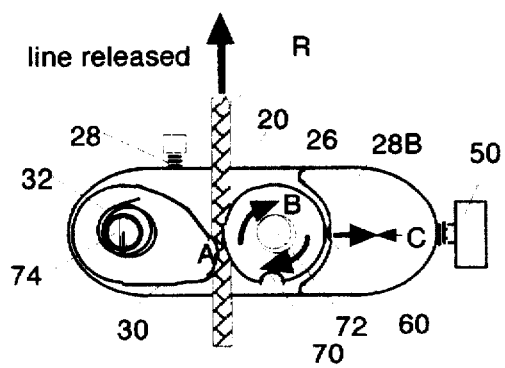
Figure 16D:
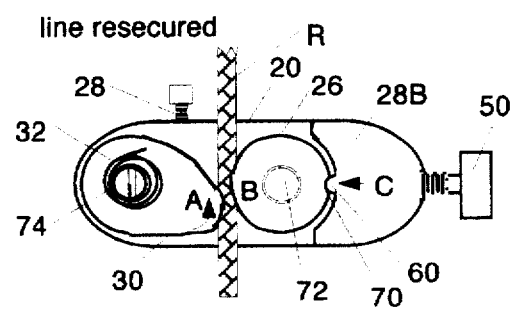

Referring now to FIG. 16C, automatic securing or recleating is accomplished mostly when the tension forces on the line R diminishes to the point where the resistance of the cleat members and means for resisting the roller member movement again prevents rolling member 26 from rotating. When this occurs, referring now to FIG. 16D, the line is again secured between cam member 30 and rolling member 26. Referring now to FIG. 14B rolling member 26D is configured for mostly one time release and will not normally recleat the line in this configuration.

(Adjusting Load)

Variable force is selectively placed on rolling member 26 by the means for adjusting resistance, for example, adjuster 50, this allows for adjustment of the load range at which automatic uncleating and cleating occurs.

(Manual Overrides)

Manual override to limit automatic line release is mostly initiated by increasing the resistance to the rolling member by the adjustment means adjuster 50, to prevent release or rotation of the rolling member. Now referring to FIGS. 2B–2C override means or adjuster extender 51 to prevent rolling member 26 movement is shown to selectivity secure rolling member 26 from moving when adjusted to mostly secure keeper 60 against rolling member 26. Alternately, referring to FIGS. 5A–5E the means for resisting rolling member 26 is overridable without the use of adjuster 50 by the mostly independent means to lock the rolling member movement. The slide 102 selectively allows for quickly preventing automatic line release without having to use adjuster 50. This prevents having to reset the desired preset load range setting when overriding is no longer desired. Alternately, referring now to FIGS. 6A–6G show another embodiment to mostly independently override automatic line release. Lever 120 selectively allows for quickly preventing automatic line release without having to use adjuster 50 to override the release mechanism.

SUMMARY, RAMIFICATIONS, AND SCOPE

As the reader can readily see that there are numerous applications and generic variations of embodiments made possible by the novel present invention. Accordingly the adjustable load automatic releasing mechanism and cleat, provide for cleating and reliable automatic release of a line. Furthermore, it provides additional advantages in that it permits convenient increasing or decreasing the tension range at which the line is automatically released while under load;

it permits automatic recleating of the line at predetermined and adjustable load ranges;

it permits retaining the line once it has been released;

it permits convenient overriding of the automatic release feature when desired by using the tension adjuster;

it permits quick and selective prevention of line release by independently overriding the automatic release mechanism without the need to readjust the preset load release setting;

it permits nearly effortless manual release of the cleated line by simply reducing adjuster force;

it permits quick and convenient manual cleating and release operations;

it permits more reliable and sure operation when wet and requires low maintenance;

it permits retrofitting to most existing cam cleats;

it permits operation in a wide variety of positions and mountings;

it permits accommodating a wide range and types of lines;

it is easily adjusted while under load in a moving environment; and it requires few components to manufacture.

The foregoing description of the preferred embodiments of the invention have been presented for the purposes of illustration and description. It is not intended to be exhaustive or limit the invention to the precise form disclosed. Many modifications and variations are possible in light of the above teaching. It is intended that the scope of the invention be limited not by this detailed description, but rather by the claims appended hereto and their legal equivalents.

I claim:

1. An adjustable load automatic line releasing mechanism for a cleat comprising:

a rolling member comprising sufficient surface to substantially restrict said line movement, said rolling member further comprising a sufficient passage to permit attachment to said cleat, said rolling member further being mostly rotatably attached to said cleat, and a resisting means for substantially restricting movement of said rolling member about said passage, said passage being substantially adjoined to an exterior surface of said rolling member, and a support and fastening for positioning said resisting means for substantially restricting movement of said rolling member mostly adjacent to said rolling member in substantially a cooperative manner whereby permitting said rolling member, said resisting means for substantially restricting movement of said rolling member to retrofitably cooperate with said cleat to releasably restrain said line in a load sensitive manner.

2. The adjustable load automatic line releasing mechanism for the cleat defined in claim 1, containing said rolling member from the group of elements consisting of;

round, oblong, multisided, striated round, striated oblong, striated multisided, grooved round, grooved oblong, grooved multisided, grooved and striated round, grooved and striated oblong, grooved and striated multisided, rolling member elements.

3. The adjustable load automatic line releasing mechanism for the cleat defined in claim 1, further comprising:

a major mounting member to facilitate sufficient positioning of said resisting means for substantially restricting movement of said rolling member in sufficient cooperation with said rolling member attached to said cleat, and an adjuster means for substantially varying the amount of force delivered by said resisting means for substantially restricting movement of said rolling member to said rolling member.

4. The adjustable load automatic line releasing mechanism for the cleat defined in claim 3, further comprising an overriding means for substantially resisting the automatic release of said rolling member.

5. The adjustable load automatic line releasing mechanism for the cleat defined in claim 3, further comprising a mounting means for varying the mounting orientation of said cleat to a provided structure in a multitude of sufficient operational positions.

6. The adjustable load automatic line releasing mechanism for the cleat defined in claim 1, further comprising an overriding means for substantially resisting the release of said line by the said resisting means for substantially resisting movement of said rolling member.

7. The adjustable load automatic line releasing mechanism for the cleat defined in claim 1, further comprising at least one rotation resistor whereby said rotation resistor cooperates with said rolling member to substantially resist said rolling member movement against said resisting means.

8. The adjustable load automatic line releasing mechanism for the cleat, rolling member defined in claim 1, further comprising a plurality of rotation resistors whereby said rotation resistors cooperate with said rolling member to substantially resist said rolling member movement against said resisting means.

9. An adjustable load automatic releasing cleat comprising:

a rolling member comprising sufficient surface to substantially restrict a line movement, said rolling member further comprising a sufficient passage to permit rotation, and a resisting means for substantially restricting movement of said rolling member about said passage, said passage being substantially adjoined to an exterior surface of said rolling member, and a biased cam member with pivotal mounting for positioning the said line in sufficient close proximity to said rolling member, and a support and attachment means for positioning said resisting means for substantially restricting movement of said rolling member mostly adjacent to said rolling member in a substantially cooperative manner, and a major mounting member and suitable fastening for the sufficient mounting of said rolling member, said biased cam member with pivotal mounting, and said support for substantially positioning said resisting means for restricting movement of said rolling member whereby permitting said rolling member, said resisting means for restricting movement of said rolling member to releasably restrain said line in a load sensitive manner.

10. The adjustable load automatic releasing cleat defined in claim 9, containing said rolling member from the group of elements consisting of;

round, oblong, multisided, striated round, striated oblong, striated multisided, grooved round, grooved oblong, grooved multisided, grooved and striated round, grooved and striated oblong, grooved and striated multisided, rolling member elements.

11. The adjustable load automatic releasing cleat, rolling member defined in claim 9, further comprising at least one rotation resistor that mostly resist said rolling member movement against said resisting means.

12. The adjustable load automatic releasing cleat, cam member defined in claim 9, further comprising an adjustment means for substantially varying the position of said cam member about said rolling member.

13. The adjustable load automatic releasing cleat defined in claim 9, further comprising a limiting means for limiting rotation of said cam about said major mounting member.

14. The adjustable load automatic releasing cleat defined in claim 9, further comprising an override to substantially resist the automatic release of said rolling member.

15. The adjustable load automatic releasing cleat defined in claim 9, further comprising an auxiliary mounting member and sufficient means for attaching said member about said cleat.

16. The adjustable load automatic releasing cleat as defined in claim 9, further comprising a mounting means for substantially varying the mounting orientation of said cleat to a provided structure in a multitude of sufficient operational positions.

17. The adjustable load automatic releasing cleat, said resisting means for substantially restricting movement of said rolling member defined in claim 9, further comprising:

a keeper that cooperates with said rolling member to selectively resist said rolling member movement, and a keeper resistance means for substantially resisting said keeper movement.

18. The adjustable load automatic releasing cleat, cam member defined in claim 13, further comprising:

an adjuster for substantially limiting the rotation of said cam member, and a lever and sufficient means for attaching said lever to cooperate with said cam member.

19. The adjustable load automatic releasing cleat defined in claim 17, further comprising an adjuster for substantially varying the resistance to said keeper.

20. An adjustable load automatic releasing cleat comprising:

a biased resistant cam member, and a resistant rolling member substantially rotatably mounted in sufficient spaced apart relation to a major mounting member, and a resisting means for applying sufficient resistance to said rolling member rotation to substantially control said rolling member rotation, and an adjuster means for substantially varying the control over said rolling members rotation, and a support and fastening for suitable positioning said means for applying resistance to said rolling member substantially adjacent and cooperative with said rolling member and a suitable means of fastening said cleat in a multitude of suitable working orientations with a working surface whereby a line is automatically releasably cleatable in a load sensitive manner.

\* \* \* \* \*